United States Patent [19]

Bryant

[11] Patent Number: 4,973,150
[45] Date of Patent: Nov. 27, 1990

[54] FILM CONSTRAINT AND FILM WRITING SYSTEM

[75] Inventor: Robert C. Bryant, Honeoye Falls, N.Y.

[73] Assignee: Eastman Kodak Company, Rochester, N.Y.

[21] Appl. No.: 498,155

[22] Filed: Mar. 23, 1990

[51] Int. Cl.$^5$ .............................................. G03B 1/52
[52] U.S. Cl. .................................. 352/222; 352/228; 352/229
[58] Field of Search ................... 352/222, 228, 229

[56] References Cited

U.S. PATENT DOCUMENTS

| | | |
|---|---|---|
| 2,849,915 | 9/1958 | Kennedy . |
| 2,943,534 | 7/1960 | Pierschel . |
| 3,103,850 | 9/1963 | Khoury et al. . |
| 3,273,953 | 9/1966 | Davee . |
| 3,400,995 | 9/1968 | Borberg et al. . |
| 3,457,007 | 7/1969 | Conroy . |
| 3,615,121 | 10/1971 | Barnett et al. . |
| 3,748,033 | 7/1973 | Harvey . |
| 3,885,131 | 5/1975 | Franceschini et al. . |
| 3,919,526 | 11/1975 | Pommers et al. . |
| 3,925,607 | 12/1975 | Hauber . |
| 4,038,663 | 7/1977 | Day et al. . |
| 4,045,098 | 8/1977 | Blondeel . |
| 4,121,175 | 10/1978 | Hamil et al. . |
| 4,168,506 | 9/1979 | Corsover . |
| 4,183,069 | 1/1980 | Roullet et al. . |
| 4,254,424 | 3/1981 | Landheer . |
| 4,411,503 | 10/1983 | Bailey et al. . |
| 4,455,066 | 1/1984 | Olson et al. . |
| 4,654,939 | 4/1987 | Silver . |
| 4,698,701 | 10/1987 | Gantzhorn et al. . |
| 4,725,890 | 2/1988 | Yamiv et al. . |

OTHER PUBLICATIONS

IBM Technical Disclosure Bulletin, vol. 15, No. 6, Nov. 1972, p. 1881.
"Modulated Air Blasts For Reducing Film Buckle", by W. Borberg, *JSMPTE*, Aug. 1952, vol. 59, pp. 94–100.

*Primary Examiner*—Monroe H. Hayes
*Attorney, Agent, or Firm*—Dennis R. Arndt

[57] ABSTRACT

A rigid cylinder is rotated about its axis of symmetry at a relatively high rate of speed by means of a motor. Around a portion of the circumference of the rotating cylinder is wrapped a flexible imaging medium such as photographic film, to which is applied longitudinal tension through means of a film transport. The film conforms to the curvature of the drum, but is held a small distance above the surface of the cylinder in equilibrium between the aerodynamic forces created by the rotating cylinder and the applied tension of the film transport, thus effecting a compliant surface air bearing. A scanning beam is used to write on the film in the line direction. Longitudinal movement of the film is used to affect scanning in the page direction.

9 Claims, 6 Drawing Sheets

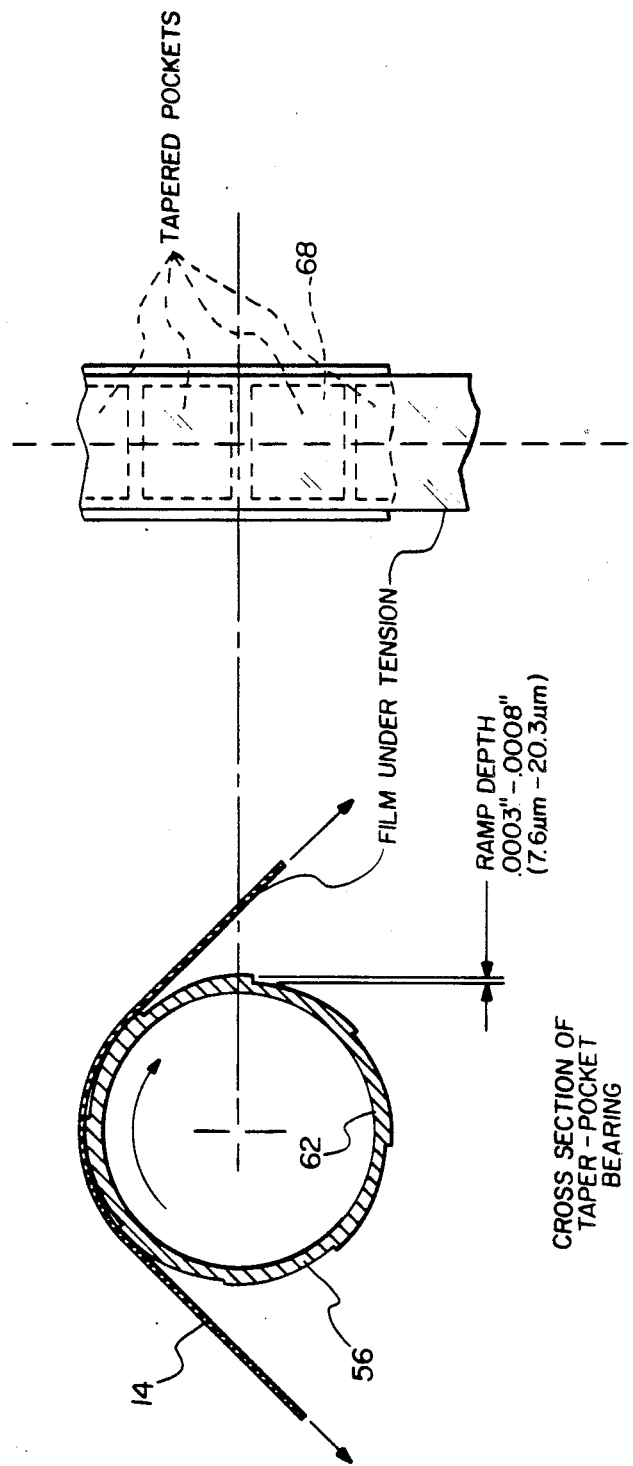

FILM CONSTRAINT AND FILM WRITING SYSTEM

CROSS REFERENCE TO RELATED APPLICATIONS

Reference is made herein to commonly-assigned, copending U.S. patent application Ser. No. 498,154, entitled FILM CONSTRAINT AND ILLUMINATION SYSTEM, in the name of Robert C. Bryant, filed concurrently herewith.

1. Technical Field of the Invention

The invention relates to the scanning or writing of information on light sensitive media such as film, and more particularly, to a means of constraining strips of light sensitive media such that it will not degrade the scanning process through deformation of the media.

2. Background of the Invention

There are a number of methods for constraining a strip of light sensitive media. The most common are the rigid frame types of film gates commonly used in motion picture projectors and similar devices. A more sophisticated version of this rigid constraint approach is the glass platen type of configuration wherein the light sensitive material is forced to conform to a single flat optically transparent surface (typically glass) or alternatively sandwiched between two such surfaces.

Desirably, the film gate should be such that physical contact between the film surface and a friction imparting element is prevented, in order to avoid scratching the film, which could possibly cause a loss of information in the written image. To this end, improvements in film gate structures have led to the development of fluid gates, to which a curtain, or stream, of air is generated in the area of the gate so as to provide a medium by way of which the film may be frictionlessly supported. An example of such an air pressure gate is described in U.S. Pat. No. 3,457,007 to Conroy, and consists of a differential pressure gate for a motion picture projector and has a plurality of peripheral ducts which pass through the walls of the gate aperture. Air pressure is introduced through these ducts in an effort to apply a substantially uniform pressure throughout an air chamber disposed on one side of the photographic film.

U.S. Pat. No. 4,411,503 to Bailey et al. is directed to an air platen bearing. The fluid bearing platen for the film gate structure contains a pair of cavities to which a pressurized fluid, such as air, is applied against opposing surfaces of the photographic film. Between each of the respective cavities, and on one side of the film, there is a thermal dynamically non-throttling material, such as porous stainless steel, through which the pressurized fluid from the cavity passes, where it is directed against opposite sides of the film.

All of the above-mentioned air bearing film gates require an external source of air pressure which can be both cumbersome and costly. Another problem that can be encountered with film gates having a rigid transparent platen have the propensity to develop optical interference patterns between transparency materials and optically flat platens unless indexing matching fluids (typically oils) are used. In addition, it is difficult to maintain true flatness of a transparency over the writing area which can be detrimental to the written image quality in systems with limited depth-of-focus.

SUMMARY OF THE INVENTION

A rigid cylinder is rotated about its axis of symmetry at a relatively high rate of speed by means of a motor. Around a portion of the circumference of the rotating cylinder is wrapped a flexible imaging medium such as photographic film to which is applied longitudinal tension. The film is held in an equilibrium position conforming to but slightly removed from the surface of the cylinder by aerodynamic forces and the applied tension, thus effecting a compliant surface air bearing. A modulated source of illumination is provided and means for scanning the illumination source laterally of the film as it is moved through the film gate.

BRIEF DESCRIPTION OF THE DRAWINGS

FIG. 6 is a side view of a modified cylinder having tapered pockets about its outer circumference for illustrative purposes, the film gap has been reduced to zero in places, in an effort to show the ramped surfaces to scale; and FIG. 7 is a front elevational view of FIG. 6.

MODES OF CARRYING OUT THE INVENTION

Figure 1:
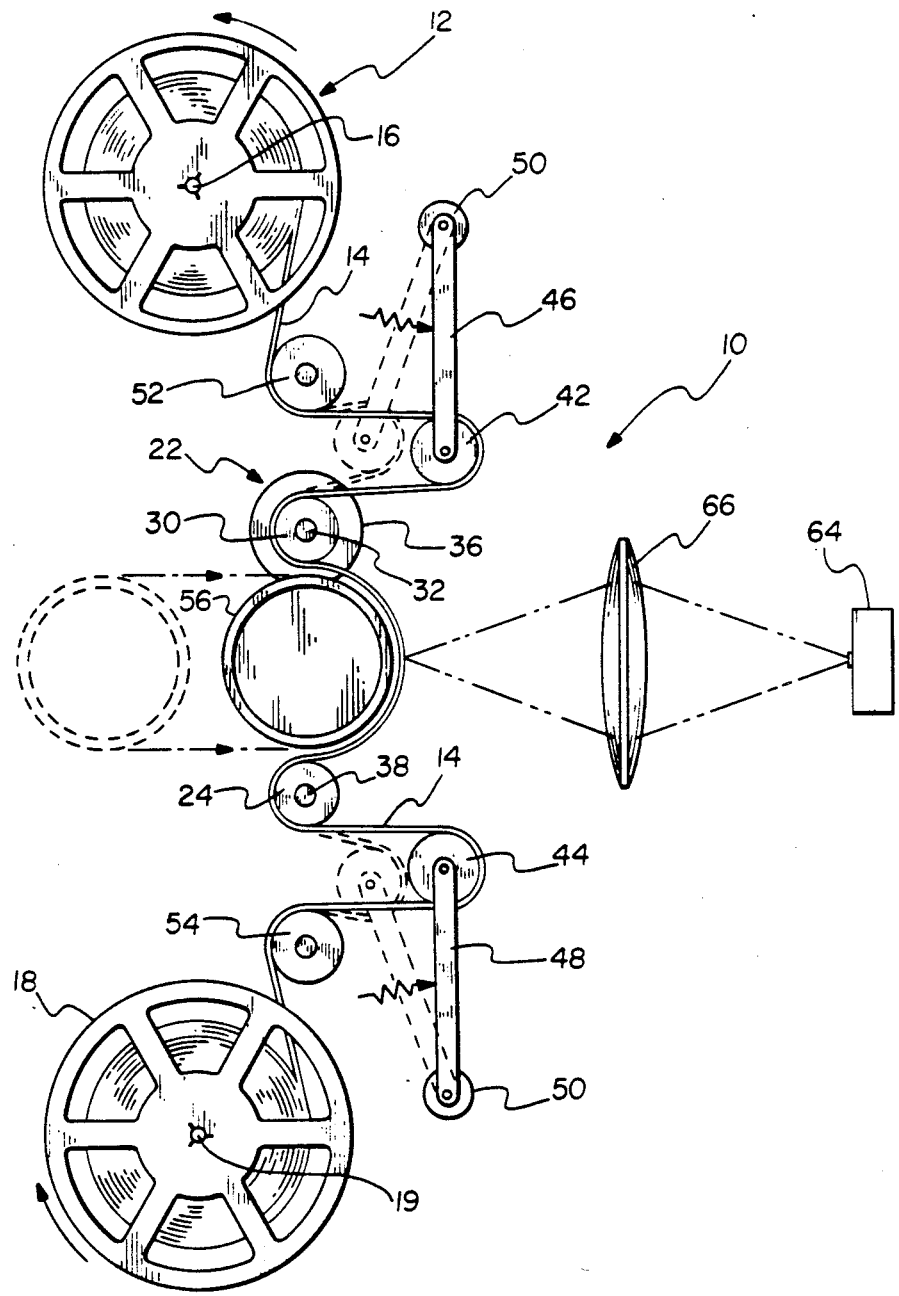
FIG. 1 is a side elevational view in schematic form of the film gate, optical system and film path, the film gap has been exaggerated for the purpose of clarity.

Because web handling apparatus are well known, the present description will be directed in particular to elements forming part of, or cooperating more directly with, the present invention, and elements not specifically shown or described herein are understood to be selectable from those known in the art.

Referring now to the drawings, and to FIGS. 1 and 2 in particular, the present invention is illustrated and will be described in connection with a film transport generally designated 10 that comprises a supply reel 12 for the film 14. The supply reel is mounted on a spindle 16 that is normally driven by a tendency or friction drive in the takeup (counter-clockwise) direction as indicated by the arrow for urging reel 12 in a direction for taking up film onto that reel. The tendency or friction drive means allows the reel to be rotated in an unwinding (clockwise) direction during removal of film from reel 12.

The film travels along a film path between reel 12 and reel 18 with reel 18 being mounted on spindle 19. Along the film path is a film gate shown generally at 20; adjacent thereto are two substantially identical and symmetrically mounted capstan drive means 22 and 24. The film gate will be discussed in detail below.

Film 14 can be advanced through the gate 20 either from supply reel 12 to takeup reel 18 or in the reverse direction. Because the transport mechanism of this invention is capable of operation for advancing film in either direction with equal facility, the terms "supply reel" and "takeup reel" are used as a matter of convenience, and each may be used with equal accuracy for designating either reel. As shown diagrammatically in FIG. 1, spindles 16, 19, are driven by motors 26, 28, respectively.

The capstan drive means 22 comprises a rotatable film-engaging drive member shown as pulley 30 mounted on spindle 32 that is driven from motor 34. In addition, an encoder 36 which is incorporated on shaft 32 and is used to accurately control the speed and direction of film movement.

Pulley 30 is located along the film path so that the film is wrapped at least partially around the pulley, the extent of the wrap being substantially 180°. Capstan 24 is substantially identical to capstan 22 having a spindle 38 which is driven by motor 40 with no encoder, only a single encoder is needed in the film path to accurately control the speed and direction of film on this transport. The capstans each act as a web tension amplifier and therefore may be used as feedback or servocontrol mechanisms for controlling tension forces in the film at film gate 20 even when relatively large static and dynamic loads and load variations are encountered during operation of the transport.

Float rollers 42 and 44 are provided along the film path between each reel 12, 18 and each capstan 22, 24 respectively. Each roller 42 and 44 is rotatably supported at one end of an arm 46 and 48 respectively that is movably connected at its other end to a support plate 50. Arms 46 and 48 can flex upwardly from the position shown in solid lines toward the position shown in dotted lines in response to an increase in tension forces encountered by that portion of the film between capstans 22 and 24 and corresponding reels 16 and 18. Arms 46 and 48 are preferably formed of a spring material or is spring biased (as viewed in FIG. 1) so that they tend to return to their solid line position when permitted to do so by film tension.

Operation of the film transport shown in FIGS. 1 and 2 will now be described. Assuming that capstan 22 is pulling film from supply reel 12 from the right side of film gate 20, the tension force in the low-tension side of the film between film gate 20 and capstan 22 is increased and this increase is amplified (to some extent) by the resulting movement of roller 44 against the bias of spring arm 48. This increases the tension in the portion of the film wrapped around pulley 30, thereby increasing the driving force applied by the pulley to the film. Capstan pulley 30 then pulls film from the loop of film around the roller 42, thereby causing deflection of roller 42 from its solid line position toward its dotted line position against the biasing force of arm 46. The increased driving force of capstan 22 coupled with the increased tension force applied to the film by virtue of the deflection of arm 42 causes film 14 to be withdrawn from supply reel 12 against the tendency or friction drive applied through spindle 16. This increases the length of film between supply reel 12 and film gate 20, and permits roller 42 to return toward its solid line position under the influence of spring arm 46 that supports it. This, in turn, reduces the radial pressure of the film against capstan pulley 30 to reduce the driving force applied by capstan 30 to film 14. The various forces acting on film 14 to produce automatically an equilibrium situation or condition wherein the driving force applied to the film by capstan 22 substantially equals the opposing forces acting on the length of film 14 between film gate 20 and supply reel 12.

The tension force in the film segment between film gate 20 and takeup reel 18 is reduced, and there is a corresponding reduction in the driving force applied by capstan 24 to the film portion wrapped around capstan 24 and between capstan 24 and reel 18. The tendency drive applied through spindle 19 to reel 18 then becomes effective to pull additional film around capstan 24 and onto takeup reel 18 in the direction shown in FIG. 1. Here, again, the forces acting on the segment of film between film gate 20 and takeup reel 18 soon produce an equilibrium situation or condition wherein the driving force applied to film 14 by capstan 24 is effectively opposed by the force applied to film 14 through the tendency drive acting on spindle 19.

Because the film-handling elements of the transport as described hereinbefore are substantially symmetrical with respect to film gate 20, reverse movement of the film from reel 18 to reel 12 is the same as described hereinbefore except, of course, that the film is driven in the opposite direction. Also, because capstans 22 and 24 are always driven in a direction to feed film toward gate 20 and because they are effective to maintain a very low tension in those segments of the film between gate 20 and each capstan 22, 24. Also, the portion of film 14 in film gate 20 is substantially isolated from the tendency drives and external forces that otherwise tend to move film in the gate, a steadier projected image is obtained when all forces are in balance. In addition, the low-tension forces encountered permits the film transport to be switched instantaneously from forward to reverse modes of operation without film damage even at very high rates of film movement.

A drive of the type previously described comprises a web tension amplifier and such may be used in a feedback or servocontrol type mechanism for automatically maintaining a low-tension loop of film adjacent to a film gate, for controlling tension of the film at the gate even when relatively large static and dynamic tension forces and tension force variations are encountered. Use of the optional encoder 36 on capstan 22 helps provide the necessary feedback to motor 34 that drives capstan 22. Thus, it can be seen that web tension force differences that are encountered can be controlled by adjusting one or a combination of several variable factors that affect operation, including, inter alia, adjusting the actual tension force applied to a whole strand adjacent the capstan, changing the radial force between the web capstan at some point within the wrap angle of the web about the capstan, modifying the extent of the wrap angle by increasing or decreasing the extent of the contact between the web and capstan drive pulley 30, and by making adjustments or changes that vary the effective coefficient of friction between the capstan and the web. Thus, it can be seen that accordingly, the encoder 36 is used to control capstans 22 and 24 and thus the tension of the film in film gate 20.

Figure 2:
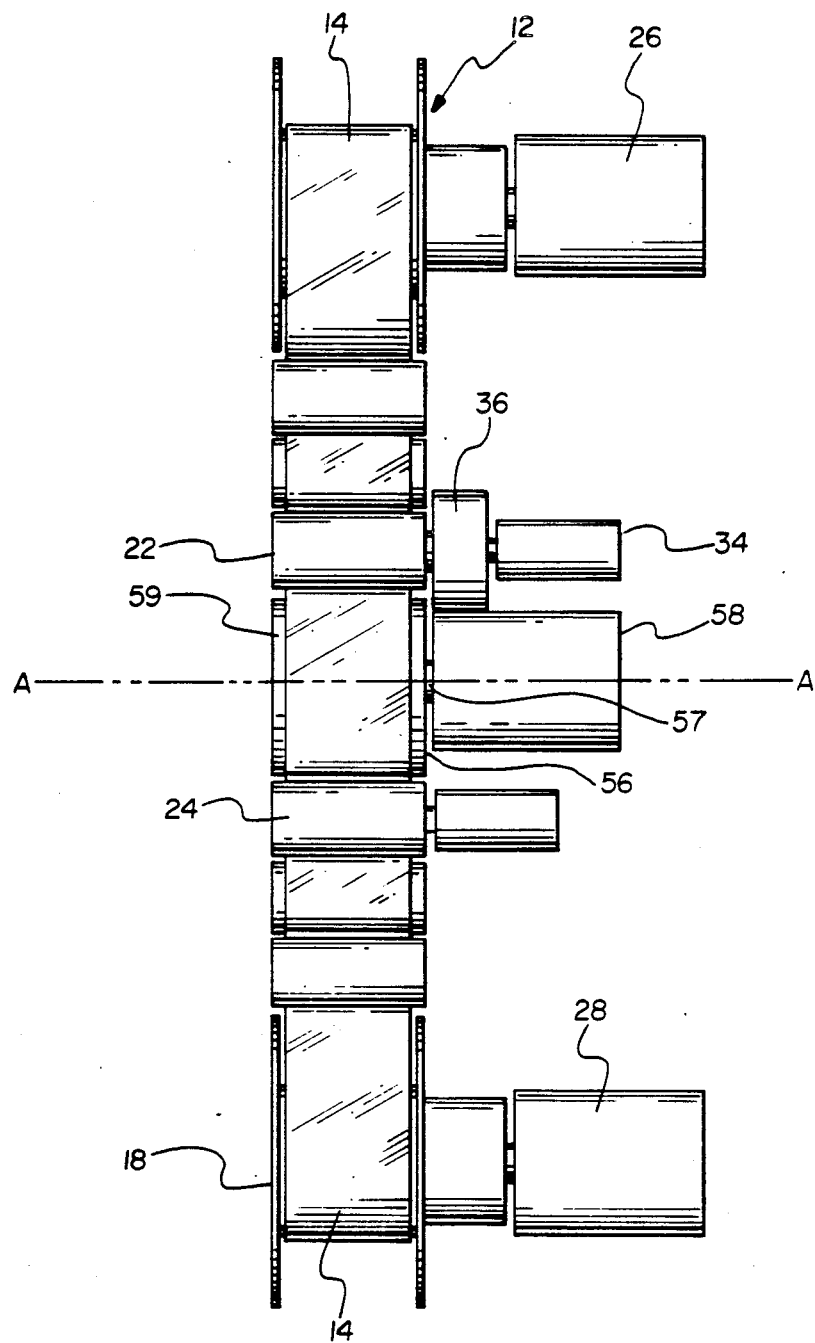
FIG. 2 is a front elevational view of FIG. 1.
Figure 3:
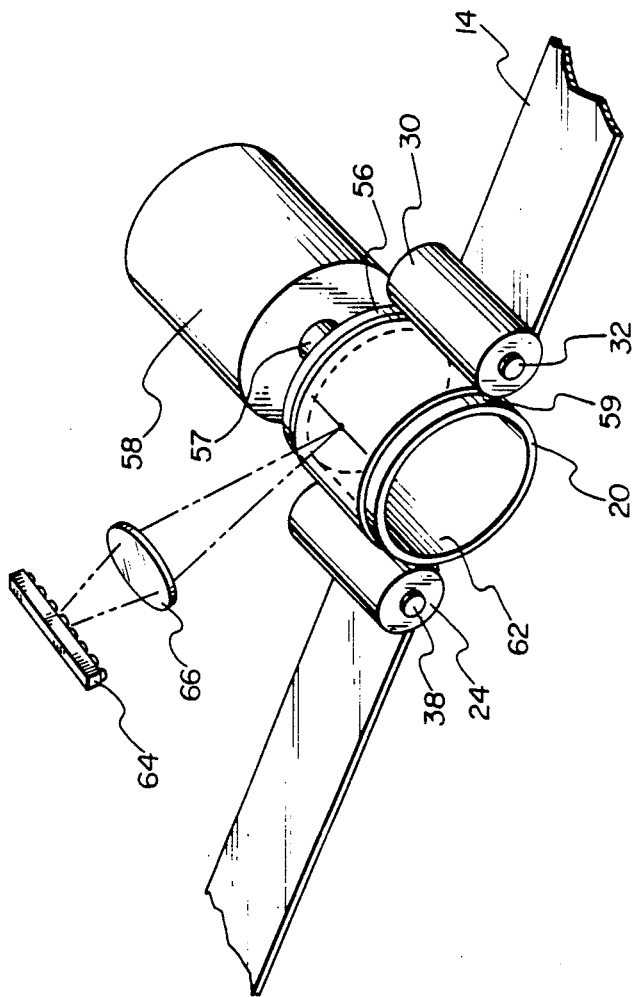
FIG. 3 is a perspective view of the film passing through the film gate wherein it is supported by the air bearing of the present invention, once again, the film gap has been exaggerated.

FIGS. 1 and 2 illustrate the use of two capstan drive motors 34 and 40 located along the film path with the film being trained or wrapped around a portion of each pulley. The portion of the film between each reel 12 and 18 and the next adjacent member may be trained around suitable guide pulleys 52 and 54. While only two guide pulleys 52 and 54 have been shown, additional pulleys can be provided in series or cascaded if required during high speed film transport.

Turning our attention to the inventive film gate 20 of the present invention, which comprises a rigid cylinder 56 rotated about its polar axis of symmetry at a relatively high rate of speed by means of a directly coupled low cost DC motor 58. Around a portion of the circumference of rotating cylinder 56 is wrapped a flexible engaging medium such as photographic film 14 to which is applied longitudinal tension by means of the film transport described above, another suitable transport system is disclosed in U.S. Pat. No. 4,752,124, filed in the name of Ueda et al. on June 21, 1988.

Rotating cylinder 56 is made of an opaque thermoset carbonate plastic or glass which has a hub 38 formed on one end with a spindle 57 mounted thereto, aligned with the axis of the cylinder A—A, for supporting cylinder 56 with the other end attached to motor 58. Motor 58 rotates cylinder 56 at a constant rotational speed of approximately 5,000 rpm. Care must be taken to ensure that the surface of cylinder 56 is true and concentric with the axis of rotation of motor 58. As mentioned earlier, the strip of photographic film 14 is wrapped around a portion of the circumference of the rotating cylinder 56. Longitudinal tension is maintained by film transport 10 described earlier; such that film 14 is held a small distance above the outer surface 59 of cylinder 56 by balancing the applied film tension with the aerodynamic forces developed by the air bearing formed around the circumference of rotating cylinder 56. The cylinder is located in a first position when the cylinder is at rest, as indicated by the dotted lines. After threading of the film, the cylinder is brought to its proper rotational speed and then moved toward the film to its second position, shown in solid lines in FIG. 1. This is done to prevent film from rubbing against the surface of the cylinder before the cylinder has reached its operational speed. A modulated beam of light that can scan laterally across the film is used to write information on the film in the form of text information or digital data. In the preferred embodiment of FIG. 1, an LED (light emitting diode) bar 64 carries a plurality of LED's along the length of the bar such that they may be energized sequentially to provide a scanning function in the line direction after being properly focused through optics 66. The present gate insures a lack of optical interference patterns and back-reflection between film and the surface of the cylinder. The optical encoder 36 in the film transport 10 is used as a feedback sensor as part of a constant velocity film transport to continuously transport the film strip through the imaging area of film gate 20 effecting a second direction of scan longitudinal to the film. Alternatively, such film movement can be accomplished by use of a step-and-repeat drive.

The aerodynamic generation of the air bearing is described by Reynold's equation as:

$$\frac{\delta}{\delta x}\left(h^3 p \frac{\delta p}{\delta x}\right) + \frac{\delta}{\delta s}\left(h^3 p \frac{\delta p}{\delta s}\right) = 6\mu U \frac{\delta ph}{\delta s} + 12\mu \frac{\delta ph}{\delta t}$$

where X is the coordinate parallel to the axis of rotation of the cylinder, h is air bearing gap thickness, p is the pressure developed within the air bearing, S is the longitudinal direction of the transparency strip, U is the relative surface velocity of the cylinder and the film transparency, $\mu$ is the viscosity of the air, and T is the web tension per unit width.

Assuming a sufficiently flexible film transparency of sufficient width and invariant characteristics with respect to time, and combining with the equilibrium equations results in what is known as the "foil bearing" equation:

$$\frac{\delta}{\delta s}\left(h^3 \frac{\delta^3 h}{\delta s^3}\right) = -\frac{6\mu U}{T} \frac{\delta h}{\delta s}$$

Figure 4:
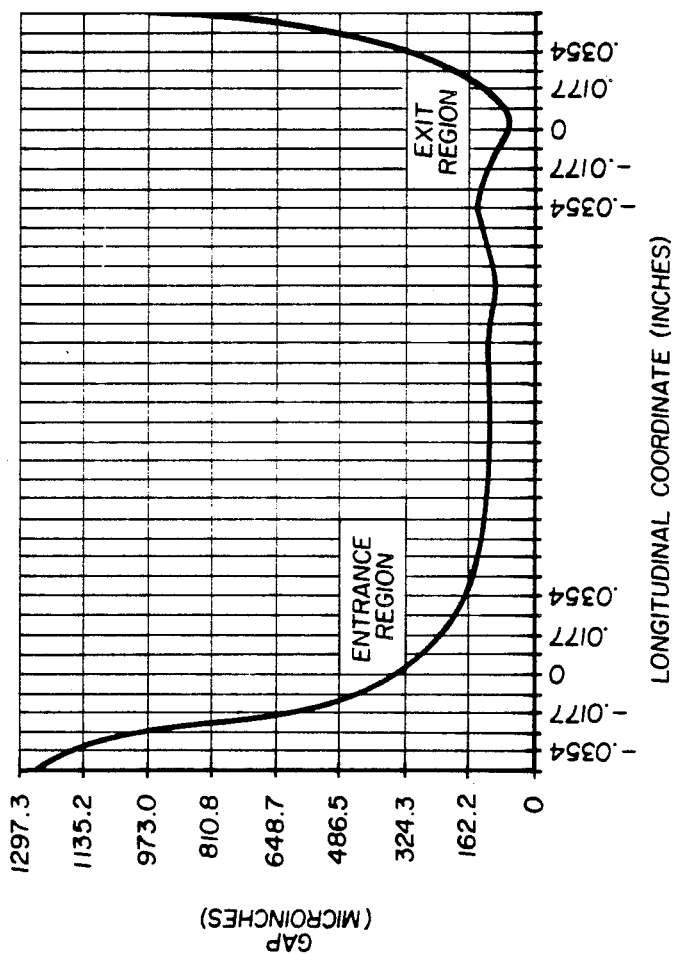
FIG. 4 is a graph showing gap size as a function of the longitudinal coordinate of the film in the gate.

The solution of this equation in fact indicates an undulation in the shape of the film transparency strip in the entrance and exit regions of the bearing area as illustrated in the graph shown in FIG. 4. However, in the central region of the bearing, the gap $h_o$ equals:

$$h_0 = Kr\left(\frac{6\mu U}{T}\right)^{\frac{2}{3}}$$

It can be noted from the equation that the gap generated in the air bearing is linearly proportional to the radius of the cylinder and is less sensitive to variations in $\mu$, U, and T the viscosity of the air, the relative surface velocity of the cylinder and the film, and the foil tension per unit width respectively. Thus, these parameters can be used to control and maintain a given gap.

The following 5 operating parameters affect the operation of this film gate are:
 (1) Cylinder radius and speed
 (2) Film transparency flexural rigidity
 (3) Wrap angle of the film
 (4) Film transparency strip tension
 (5) Air viscosity The operation of each of these parameters and how they affect the film gate will be discussed individually.

Cylinder Radius and Speed

A primary concern that determines the upper bound as to the size of the cylinder that can be used practically is the rotational velocity which determines the induced centrifugal loading of the cylinder.

The parameters that represent the lower bounds upon size and speed relate to such factors as the minimum radius of curvature that can be induced in a film web without imparting damage to the web. In addition, the forces required to bend a web around too small a radius would exceed the forces capable of being generated by the air bearing to maintain the desired gap between the film and cylinder. This is because minimal aerodynamic lift is developed at low rotational speeds of the cylinder for a given tension level in the film transparency, this would be a determination of a minimum radius for the cylinder.

Another factor that should be considered in determining the size of the opaque plastic or glass cylinder is the centrifigually induced tangential or "hoop" stress. A stress of approximately 500lb/in² (3.446 Mpa)* was found to constitute an upper limit for plastic. However, if another material such as steel were used, rotational speeds could be increased significantly as a result of increased strength, thereby increasing lift around the circumference of the cylinder significantly. Plastic, on the other hand, was also found to be satisfactory from a cost standpoint when fabrication is considered.
*Mpa=Micro Pascal The maximum tangential (hoop) stress and radial stress as a function of rotational velocity are given by the following respective equations:

$$(\sigma_h)_{max} = \frac{\gamma\omega^2 r_0^2}{g}\left(\frac{3+\nu}{4}\right)$$

$$(\sigma_r)_{max} = \frac{\gamma\omega^2 r_0^2}{g}\left(\frac{3+\nu}{8}\right)$$

where:

$\sigma_n$—maximum tangential stress in the cylinder;
$\sigma_r$—maximum radial stress in the cylinder.
$\omega$ = rotational velocity
$r_0$—outer radius;
V—Poisson's ratio of cylinder material;
$\gamma$—mass density of cylinder material;
g—standard acceleration due to gravity.

Figure 5:
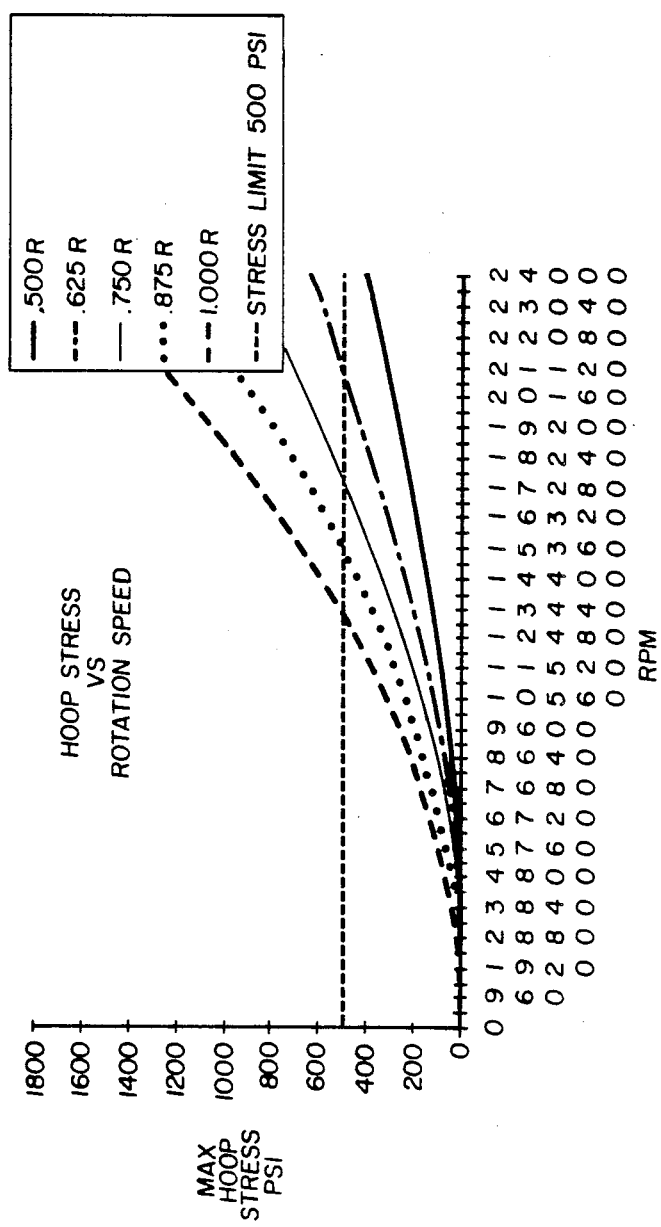
FIG. 5 is a graph showing Hoop Stress as a function of rotational speed of the cylinder.

FIG. 5 illustrates a graph for glass cylinders of various sizes plotted for max hoop stress in psi vs rotational speed in RPM.

Film Strip Transparency Flexural Rigidity

Photographic film transparencies generally display thicknesses between 0.0005 inches (0.013 mm) and 0.0070 (0.178 mm) inches and are commonly produced from acetate or polyester materials with flexural modulae ranging from 200,000 lb/in$^2$ (1,380 MPa) to 2,000,000 lb/in$^2$ (13,780 MPa) respectively. Combining the effects of these thicknesses and material stiffnesses, these properties combined yield flexural rigidities of from $2.1 \times 10^{-6}$ lb-in$^2$ ($6.03 \times 10^{-9}$ Nm$^2$)* to $6.0 \times 10^{-2}$ lb-in$^2$ ($1.72 \times 10^{-4}$ Nm$^2$)* per inch of width. Common widths for film transparency strip materials currently include 16 mm (0.630″), 35 mm (1.378″) and 70 mm (2.756″) sizes. Consequently, overall flexural rigidity that is likely to be encountered by this type of device can range from $1.3 \times 10^{-6}$ lb-in$^2$ ($3.73 \times 10^{-9}$ Nm$^2$) to 0.2 lb-in$^2$ ($5.74 \times 10^{-4}$ Nm$^2$), a range of a factor of $10^5$. Accordingly, selection of a cylinder diameter and other bearing parameters must consider the flexural rigidity of the film in conjunction with the amount of tension to ensure that the force, or lift developed by the air bearing will be sufficient to preclude touch-down of the film to the surface of the cylinder.

*Nm$^2$ = Newton-meter$^2$

Wrap Angle

The limits on the angle of wrap around the circumference of the cylinder that the film subtends are determined by the end effect undulations mentioned previously and the rigidity of the film which would limit the wrap angle to some angle less than that which would cause permanent damage to the film. In addition, if the longitudinal dimension of the effective bearing area is not great enough, the nonuniformities in the air bearing gap will be noticeable in the scanning process.

Transparency Strip Tension

Tension levels for handling strip materials depend upon thickness and are generally limited to the following values to preclude undue stress and attendant deformation:

0.0005 inches (0.013 mm) thick—0.25 lb per inch of film width; (43.8 N per m of film width)
0.0001 inches (0.025 mm) thick—0.5 lb per inch of film width; (87.6 N per m of film width)
0.005 inches (0.127 mm) thick—2.5 lb per inch of film width; (437.8 per m of film width)
0.007 inches (0.178 mm) thick—3.5 lb per inch of film width. (612.9 N per m of film width) Substituting the following values in the air gap equation for $h_0$:

K = 0.643 (a dimensionless shape/stiffness
r = 0.75 inches ($19.05 \times 10^{-3}$ m)
$\mu$ = 2.62 E-$\alpha$ lb/sec/in$^2$ (18.1 $\mu$N−sec/m$^2$)
U = 392.5 inches/sec (9.975 m/sec) (based upon rotational speed of 5,000 rpm) results in a theoretical air gap of 0.000160 inches (4.06 $\mu$M) which is more than sufficient to preclude visible interface patterns when using incandescent or fluorescent light or other light source having relatively low coherence and sufficient for coherent light sources with depths of focus of less than 1 $\mu$m.

Air Viscosity

Although the performances of the apparatus described herein are relatively insensitive to variations in air viscosity such as may occur at higher elevations, it is obviously not suitable for use in such rarefied atmospheres that may be encountered in aerospace applications without the supply of a controlled atmosphere such as nitrogen gas.

The air bearing configuration described above is the simplest configuration possible for operation in that it uses a featureless cylinder. It should be understood that the performance of the bearing can be enhanced, by the addition of certain features to surface 59 of rotating cylinder 58. Such a feature could be the "tilted shoe" or "taper pocket" bearing. This type of design provides a number of tilted surfaces or ramps followed by a strip which leads up to the next tilted surface 68 of cylinder 58 as illustrated in FIG. 6. Essentially, each of the ramps acts as a wedge or pump to increase the efficiency of the air bearing.

While the invention has been described in conjunction with the specific embodiment thereof, it is evident that many alternatives, modifications, and variations will be apparent to those skilled in the art in light of the foregoing description.

Accordingly, it is intended to embrace all such alternatives, modifications, and variations as fall within the spirit and broad scope of the appended claims.

Advantages and Industrial Applicability

The present invention is useful in a COM (computer output microfilmer) or in a digital optical tape machine for writing data on a light sensitive material such as film to form a latent image thereon, so that the information may be easily retrieved after the material has been processed. The improvement offered by the present invention increases the flatness of the film across the width of the writing area, which is important in systems with limited depths-of-focus. In addition, optical interference patterns between the film and support surface have been eliminated, as well as a reduction in abrasion and wear between the film and support surfaces. These advantages are achieved without the requirement for any external source of pressurized air for the air bearing film gate.

What is claimed is:

1. A film gate for frictionlessly constraining film said gate comprising:
   a film transport for transporting said film longitudinally in either direction while maintaining a predetermined tension in said film;

means for controlling said film transport to accurately position the desired portion of the film in the gate;

a cylinder aligned with its major axis perpendicular to the longitudinal movement of said film;

drive means for rotating said cylinder about its axis;

inlet and outlet constraint means located adjacent said cylinder so as to define a path for said film around a portion of the periphery of said cylinder where it is held a small distance above the surface of the cylinder by a balance of aerodynamic forces developed by the rotating cylinder and the applied tension of the film transport; and means for writing a line of information across the film in said film gate.

2. A film gate according to claim 1 wherein the film is wrapped less than 180° about the circumference of said cylinder.

3. A film gate according to claim 2 wherein said cylinder is in a first position when the cylinder is not rotating and a second position during rotation.

4. A film gate according to claim 2 wherein said cylinder is moved toward the film after the rotating cylinder is up to speed.

5. A film gate according to claim 4 wherein said cylinder is made of glass.

6. A film gate according to claim 4 wherein said cylinder is made of thermoset carbonate.

7. A film gate according to claim 4 wherein said cylinder is rotated at a speed of approximately 5,000 rpm.

8. A film gate according to claim 4 wherein the surface of the cylinder has formed therein a series of tapered-pockets composed of a number of ramps, the lower end of which is below the surface of the upper end of the ramp, and is at the surface of the cylinder whereby the ramps increase the lift generated by the rotating cylinder.

9. The film gate according to claim 2 wherein the small distance between the surface of the cylinder and the film is represented by the following:

$$h_0 = Kr \left( \frac{6 \mu U}{T} \right)^{\frac{2}{3}}$$

where:
ho is the distance between the surface of the cylinder and the film;
T is the film tension per unit width;
U is the relative surface velocity of the cylinder and the film;
$\mu$ is the viscosity of the air;
K is a constant stiffness factor and;
r is the radius of the cylinder.

* * * * *